E. WEAVER.
LEAD ADJUSTMENT FOR PROPELLER BLADES.
APPLICATION FILED SEPT. 8, 1917.
1,405,643. Patented Feb. 7, 1922.
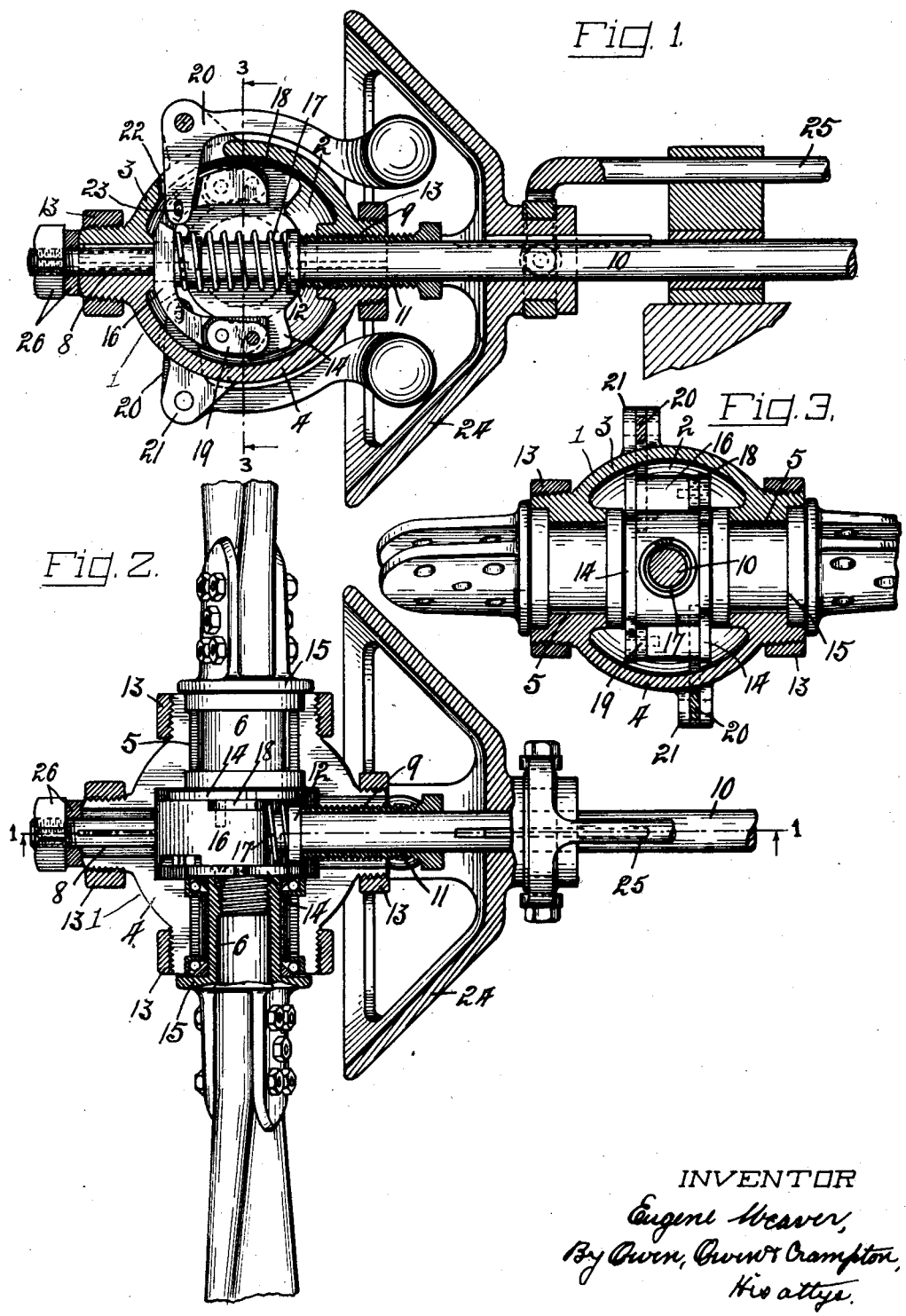
INVENTOR
Eugene Weaver,
By Owen, Owen & Crampton,
His attys.

UNITED STATES PATENT OFFICE.

EUGENE WEAVER, OF BRYAN, OHIO.

LEAD ADJUSTMENT FOR PROPELLER BLADES.

1,405,643.  Specification of Letters Patent.  Patented Feb. 7, 1922.

Application filed September 8, 1917. Serial No. 190,354.

*To all whom it may concern:*

Be it known that I, EUGENE WEAVER, a citizen of the United States, and a resident of Bryan, in the county of Williams and State of Ohio, have invented a certain new and useful Lead Adjustment for Propeller Blades; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to lead adjusting means for propeller-blades of the type particularly used on aeroplanes or the like. In the use of aeroplanes it is particularly desirable in starting from rest position to have the propeller-blades set with a small degree of lead, and when the machine has been raised from the ground and is nicely running, to then increase the speed thereof by advancing the lead a greater or less extent to suit conditions. It is therefore important to have some means for adjusting the propeller-blades to accomplish this, and the primary object of my invention is to provide such means. Further objects and advantages of the invention will be apparent from the following detailed description.

While the invention, in its broader aspect, is capable of embodiment in numerous forms, one embodiment thereof is illustrated in the accompanying drawings, in which—

Figure 1 is a central longitudinal section of a means embodying the invention, taken on the line 1—1 in Fig. 2. Fig. 2 is a similar section taken on the plane of separation of the hub sections, with parts in full, and Fig. 3 is a cross-section on the line 3—3 in Fig. 1, with parts in full.

Referring to the drawings, 1 designates the hub-shell of a propeller-wheel, said shell having an interior chamber 2, and, in the present instance, being substantially spherical in form, but is not necessarily restricted to such shape. The hub-shell is split through its center to form the two separable semi-spherical sections or halves 3 and 4, and is provided at diametrically opposite points in the line of separation of the sections with bearing openings 5, 5, in each of which a stub-shaft or journal 6, projecting longitudinally from the inner end of a propeller-blade 7, is mounted for free rotary movements, the journal, in the present instance, having a ball-bearing mount in the opening. The hub-shell is also provided in line with the point of separation of its sections and at right angles to the bearing openings 5, 5 with oppositely disposed openings 8 and 9, through which the propeller-shaft 10 projects, the shaft being keyed at its end in the opening 8. A sleeve 11 is threaded through the opening 9 in close encircling relation to the shaft and forms an adjustable stop for the thrust-collar 12, which is mounted on the shaft within the hub chamber. The hub sections are secured together, in the present instance, by outwardly extending the wall of each opening 5, 8 and 9 in the form of an annular sleeve or boss and threading binding nuts 13 thereon, the threads being preferably cut on a taper to effect a gradual tightening as each nut is screwed home.

The stub-shafts or journals 6 of the propeller-blades are provided with inner and outer flanges 14 and 15, respectively, which cooperate with the end walls of the respective bearings 5 to prevent longitudinal movements of the blade-shafts therein.

A yoke 16 of U-form, in the present instance, is mounted on the shaft 10 for shifting movements longitudinally thereof within the hub chamber 2, the shaft projecting through the center of the yoke and the legs of the latter extending lengthwise of the shaft and away from the outer end of the hub 1, or that to which the shaft 10 is keyed. A coiled compression spring 17 is mounted on the shaft 10 between the thrust-collar 12 and yoke 16 and serves to normally retain said yoke at the limit of its outward movement with respect to the shaft or in stop contact with the shell at the inner end of the bearing opening 8 thereof, as best shown in Fig. 1. The wings or legs of this yoke fit quite closely between the flanges 14 at the inner ends of the journals 6, 6 of the propeller-blades and one yoke-leg is connected by a link 18 to one flange 14 at one side of its axis, while the other yoke-leg is connected to the other flange 14 by a link 19 at the other side of its axis, as best shown in Figs. 1 and 3. It is thus evident that a movement of the yoke 16 longitudinally of the shaft 10 will impart simultaneous reverse rocking movements to the propeller-blades to increase or lessen the lead thereof, depending on the direction of movement of the yoke. The arrangement is such, in the present instance, that a movement of the yoke 16 away from the bearing opening 8, or against the tension of the spring 17, will effect an increase of the propeller-blade lead, the normal position of the blades being suitable for starting and slow running.

The movement of the yoke 16 against the tension of the spring 17 to increase the lead of the blades may be automatic and controlled by the speed of rotation of the shaft 10, or it may be manually controlled, as desired. In the present instance, I have illustrated an automatic governor means for controlling the lead changing movements of the yoke, such mechanism embodying the two bell-crank levers 20, 20, which are fulcrumed to ears 21 on the respective hub sections and have their short arms projecting inward through registering openings 22 in the hub sections and in pin-and-slot connection with the adjacent leg of the yoke 16, as at 23. The other arm of each lever projects forward or away from the end of the hub against which the yoke 16 abuts and is weighted at its free end to facilitate a rocking of the levers by centrifugal action when revolved with the hub. The centrifugal movement of the governor-levers causes a movement of the yoke 16 against the tension of the spring 17 and in a direction to increase the lead of the propeller-blades. A conical governor control member 24 is feathered on the shaft 10 for shifting movements axially thereof and has its conical portion disposed in encircling relation to the free ends of the governor-levers 20 in position for the ends of such levers to have their outward centrifugal movements limited by contact with said member. By shifting the control member in one direction or the other the extent of permissible centrifugal movement of the levers is regulated, as is apparent. A control-rod 25 for the member 24 extends therefrom to a position within convenient reach of the operator.

In the use of my device it is evident that in starting a machine from rest position, or when running slow, the centrifugal action of the governor-levers 20 is not sufficient to overpower the spring 17 and effect a movement of the yoke 16 to increase the propeller-blade lead. It is evident, however, that as the machine increases its speed the resistance of the air on the propellers lessens, thus permitting the engine to increase its speed. As such engine speed is increased the governor-levers act to force the yoke 16 against the tension of the spring 17 and to increase the lead of the propeller-blades so that the blades have a greater propelling force in contact with the air and the speed of the machine is accordingly increased. The reverse action is present in stopping or slowing down the machine.

It is evident that I have provided a simple and efficient propeller-blade lead adjusting means, all of the parts of which are assembled without the use of screws or bolts and may be separated by removing the binding-nuts 13 from the respective bearing-bosses of the hub-shell, as this permits a separation of the shell sections after which the blade carrying and adjusting parts may be withdrawn from the shell and separated. A pair of nuts 26 are mounted on the rear end of the shaft 10 without the hub-bearing 8 and serve to prevent relative longitudinal movements of the shaft and shell. One of these nuts serves as a lock-nut and the other has its inner side dished or provided with a tapered edge flange to adapt it, when screwed home, to receive the correspondingly shaped end of the adjacent bearing-boss to serve to retain the shell parts in assembled relation.

I wish it understood that my invention is not limited to any specific construction, arrangement or form of the parts, or to the use of automatic governing or control means for the lead changing means, as the invention is capable of numerous modifications and changes without departing from the spirit of the claims.

Having thus described my invention, what I claim as new, and desire to secure by Letters Patent, is—

1. In combination, a hub, a plurality of propeller-blades carried by said hub for rotary lead changing movements relative thereto and to each other, and means normally retaining one lead adjustment of the blades and automatically operable to adjust the blades to vary the lead thereof when the blades are revolving at a predetermined speed.

2. In combination, a propeller-hub, propeller-blades carried by said hub for relative lead adjusting movements, means within the hub connecting said blades and normally retaining them in one position of lead adjustment, and centrifugal governor means connected to said first means and operable by the speed of rotation of the hub to move said first means to vary the blade lead from normal position.

3. In combination, a propeller-shaft, a hub carried by said shaft, propeller-blades carried by said hub for relative lead adjusting movements, a member carried by said shaft for yielding movements in one direction from normal position, connection between said member and blades to impart simultaneous relative lead adjusting movements thereto when the member is moved relative to the shaft, and means controlling the movements of said member and operable by rotation of the propeller to move it from normal position.

4. In combination, a propeller-shaft, a hollow hub fixed to said shaft, a yoke mounted on the shaft for axial movements relative thereto within the hub, connection between said yoke and each of said blades operable to impart relative lead adjusting movements to the blades when the yoke is moved on the shaft, and means connected to said yoke and operable by rotation of the propeller to move the same to vary the lead of said blades.

5. In combination, a propeller-shaft, a hollow hub fixed to said shaft, a yoke mounted on the shaft for axial movements relative thereto within the hub, spring means normally retaining said yoke in one position of its movement relative to the shaft, connection between said yoke and each of said blades operable to impart relative lead adjusting movements to the blades when the yoke is moved on the shaft and means connected to said yoke and operable to move the same from normal position.

6. In combination, a propeller shaft, a hollow hub fixed thereto, propeller blades journaled at their inner ends in said hub for rotary lead adjusting movements, a member disposed between the inner ends of said blades within the hub and movable longitudinally of said shaft, means normally retaining said member in one position of its movement and yieldingly resisting a movement thereof from the opposite direction, separate connections between said member and said blades to impart opposite lead changing movements thereto when the member is moved, and centrifugal governor means carried by the hub and connected to said member to control the movements of the member.

7. In combination, a shaft, a hollow hub fixed thereto, a centrifugal governor actuated by the rotation of the shaft and hub and having a member disposed within the hub and yieldingly movable in one direction axially of the shaft, propeller blades journaled in opposite sides of said hub for lead changing movements, and separate connection between said member and the inner ends of the respective blades to impart lead changing movements thereto from movements of said member.

8. In combination, a propeller shaft, a hub mounted thereon and having axially aligned bearings in opposite sides thereof, a propeller blade journaled at its inner end in each of said bearings, and means normally retaining one lead adjustment of the blades and automatically operable by predetermined speed of rotation of the hub to adjust the blades to vary the lead thereof.

9. In combination, a propeller shaft, a hollow hub fixed to said shaft and having axially aligned bearings in opposite sides thereof, a propeller blade journaled at its inner end in each of said bearings for lead changing adjustment relative to the hub, and means disposed in part within said hub between the inner ends of said blades in connection with each and operable to rotate said blades relative to the hub to vary the lead adjustment thereof by a variation in the speed of rotation of the hub.

10. In combination, a hub, a plurality of propeller blades carried by said hub for rotary lead changing movements relative thereto, means connected to said blades and automatically operable by rotation of the hub to adjust the blades to vary the lead thereof, and variable manually controlled means for limiting the lead adjusting movements of said last means.

11. In combination, a hollow hub, a plurality of propeller blades carried by said hub for rotary lead changing movements relative thereto, and means connected to the blades interiorly of the hub and automatically operable by rotation of the hub to rotate the blades to vary the lead thereof.

12. In combination, a propeller shaft, a hub fixed thereto, a plurality of propeller blades carried by the hub for rotary lead changing movements relative thereto, centrifugal governor means connected to said blades interiorly of the hub and operable by rotation of the hub to vary the lead adjustment of said blades, a spring acting on said governor means interiorly of the hub to normally retain it and the blades in one position of lead adjustment, and means projecting from the hub and manually operable to vary the tension of said spring.

13. In combination, a hollow hub, a plurality of propeller blades carried by said hub for rotary lead changing movements relative thereto, means connected to the blades interiorly of the hub and automatically operable by rotation of the hub to rotate the blades to vary the lead thereof, and variable manually controlled means for limiting the lead adjusting movements of said last means.

14. In combination, a propeller shaft, a hollow hub fixed to said shaft and having axially aligned bearings in opposite sides thereof, a propeller blade journaled at its inner end in each of said bearings for lead changing adjustment relative to the hub, means disposed in part within said hub between the inner ends of said blades in connection with each and operable to rotate said blades relative to the hub to vary the lead adjustment thereof by a variation in the speed of rotation of the hub, and variable manually controlled means for limiting the lead adjusting movements of said last means.

In testimony whereof, I have hereunto signed my name to this specification.

EUGENE WEAVER.